(12) United States Patent
Nishimura et al.

(10) Patent No.: US 10,676,112 B2
(45) Date of Patent: Jun. 9, 2020

(54) AXLE BOX SUSPENSION OF RAILCAR BOGIE

(71) Applicant: KAWASAKI JUKOGYO KABUSHIKI KAISHA, Kobe-shi, Hyogo (JP)

(72) Inventors: Takehiro Nishimura, Kobe (JP); Yoshi Sato, Sanda (JP); Yukitaka Taga, Kobe (JP); Yousuke Tsumura, Kobe (JP); Keiichiro Kamura, Kobe (JP); Fumikazu Kounoike, Kakogawa (JP); Koichi Murata, Kobe (JP); Francois Olivier Uchida, Kobe (JP); Yuta Yoshimatsu, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 235 days.

(21) Appl. No.: 15/772,112

(22) PCT Filed: Sep. 7, 2016

(86) PCT No.: PCT/JP2016/004077
§ 371 (c)(1),
(2) Date: Apr. 30, 2018

(87) PCT Pub. No.: WO2017/073002
PCT Pub. Date: May 4, 2017

(65) Prior Publication Data
US 2018/0312176 A1 Nov. 1, 2018

(30) Foreign Application Priority Data
Oct. 29, 2015 (JP) .................................. 2015-212677

(51) Int. Cl.
*B61F 5/30* (2006.01)
*B61F 5/44* (2006.01)
(Continued)

(52) U.S. Cl.
CPC ................ *B61F 5/305* (2013.01); *B61F 5/04* (2013.01); *B61F 5/44* (2013.01); *B61F 5/46* (2013.01);
(Continued)

(58) Field of Classification Search
CPC ...... B61F 5/44; B61F 5/06; B61F 5/10; B61F 5/142; B61F 5/16; F16C 7/02; F16C 11/06; F16C 11/08
See application file for complete search history.

(56) References Cited

U.S. PATENT DOCUMENTS 3,948,188 A * 4/1976 Zehnder ................. B60G 11/04
105/167
4,619,544 A * 10/1986 Laidely .................... B60G 5/02
16/2.1
(Continued)

FOREIGN PATENT DOCUMENTS

| JP | H10-264812 A | 10/1998 |
|----|--------------|---------|
| JP | 2010-184684 A | 8/2010 |
| JP | 2013-23094 A | 2/2013 |

OTHER PUBLICATIONS

Dec. 13, 2016 International Search Report issued in International Patent Application No. PCT/JP2016/004077.

*Primary Examiner* — Jason C Smith
(74) *Attorney, Agent, or Firm* — Oliff PLC

(57) ABSTRACT

An axle box suspension includes: an axle beam including an axle beam main body portion extending from the axle box in a car longitudinal direction and a pin portion projecting from a tip end of the axle beam main body portion in the car longitudinal direction; a tubular elastic bushing including an inner tube portion, an outer tube portion, and an elastic portion interposed between the inner tube portion and the outer tube portion, the inner tube portion being fitted to the pin portion; an adapter attached to the outer tube portion and
(Continued)

coupling the axle beam and the bogie frame; and a first stopper attached to the pin portion and configured to, when the axle box is displaced relative to the bogie frame toward one side in the car longitudinal direction by a predetermined distance, contact the adapter to restrict displacement of the axle box.

16 Claims, 5 Drawing Sheets

(51) Int. Cl.
  *F16F 1/38* (2006.01)
  *B61F 5/04* (2006.01)
  *B61F 5/46* (2006.01)
  *F16F 1/387* (2006.01)
(52) U.S. Cl.
  CPC ............ *F16F 1/387* (2013.01); *F16F 1/3828* (2013.01); *F16F 2224/025* (2013.01); *F16F 2234/02* (2013.01); *F16F 2236/04* (2013.01)

(56) References Cited

U.S. PATENT DOCUMENTS

| | | | |
|---|---|---|---|
| 5,189,962 A * | 3/1993 | Iwamura | B61F 5/30 105/218.2 |
| 9,592,840 B2 * | 3/2017 | Okumura | B61F 5/302 |
| 2004/0123769 A1 * | 7/2004 | Nishimura | B60G 11/14 105/218.2 |
| 2005/0116436 A1 * | 6/2005 | Landrot | B61F 5/305 280/124.109 |
| 2010/0294164 A1 * | 11/2010 | Oku | B61D 13/00 105/182.1 |
| 2011/0253004 A1 * | 10/2011 | Nishimura | B61F 5/325 105/220 |
| 2014/0137764 A1 * | 5/2014 | Shimokawa | B61F 5/38 105/168 |
| 2014/0137765 A1 * | 5/2014 | Nishimura | B61F 3/04 105/182.1 |
| 2014/0158015 A1 * | 6/2014 | Shimokawa | B61F 5/44 105/165 |
| 2018/0312176 A1 * | 11/2018 | Nishimura | B61F 5/46 |
| 2018/0319411 A1 * | 11/2018 | Nishimura | B61F 5/325 |
| 2018/0327003 A1 * | 11/2018 | Nishimura | F16C 11/0614 |
| 2019/0016354 A1 * | 1/2019 | Nishimura | B61H 1/00 |
| 2019/0084596 A1 * | 3/2019 | Taga | B61F 5/30 |
| 2019/0291583 A1 * | 9/2019 | Sato | F16F 1/38 |
| 2019/0329659 A1 * | 10/2019 | Tamura | B61F 5/30 |
| 2019/0375436 A1 * | 12/2019 | Tamura | B61F 5/30 |
| 2020/0039541 A1 * | 2/2020 | Tamura | B61F 5/301 |

* cited by examiner

AXLE BOX SUSPENSION OF RAILCAR BOGIE

TECHNICAL FIELD

The present invention relates to an axle box suspension of a railcar bogie, the axle box suspension being configured to couple an axle box to a bogie frame, the axle box accommodating a bearing supporting an axle.

BACKGROUND ART

In a typical axle beam type axle box suspension of a railcar bogie, a rubber bushing for elastically coupling a tip end portion of an axle beam to a bogie frame is arranged such that an axis of the rubber bushing extends in a car width direction (see PTL 1, for example). As a bogie for improving curved line passing performance of a railcar, proposed is a steering bogie configured such that wheelsets tilt in a yawing direction in accordance with curvature of a curved track. To cause the wheelsets to smoothly tilt relative to the bogie frame, supporting stiffness of the rubber bushing needs to be reduced.

For example, PTL 2 discloses a configuration in which: the axis of the rubber bushing extends in a car longitudinal direction; and the rubber bushing is fitted to a support shaft extending from the axle box in the car longitudinal direction. PTL 2 describes that according to this configuration, the rubber bushing easily expands and contracts in the car longitudinal direction, and the axle box can be largely displaced relative to the bogie frame in the car longitudinal direction. Further, PTL 3 discloses a configuration in which a stopper is provided in the vicinity of an axle spring arranged at an upper side of the axle box and restricts the axle box such that the axle box is not displaced beyond a displacement magnitude generated when axles are maximally steered.

CITATION LIST

Patent Literature

PTL 1: Japanese Laid-Open Patent Application Publication No. 2010-184684
PTL 2: Japanese Laid-Open Patent Application Publication No. 10-264812
PTL 3: Japanese Laid-Open Patent Application Publication No. 2013-23094

SUMMARY OF INVENTION

Technical Problem

As in the configuration of PTL 2, when the axle box is easily displaced relative to the bogie frame in the car longitudinal direction, this displacement of the axle box is desired not to become excessive. However, according to the configuration of PTL 3, since frictional resistance is generated between the axle box and the bogie frame with the stopper acting, the expansion and contraction of e axle spring are inhibited. With this, there is a possibility that a vibration absorbing function of the axle spring when the stopper is acting deteriorates, and fluctuations of wheel loads of wheels increase.

An object of the present invention is to, in an axle box suspension configured such that an axis of an elastic bushing extends in a car longitudinal direction, suppress fluctuations of wheel loads with a stopper acting.

Solution to Problem

An axle box suspension of a railcar bogie according to one aspect of the present invention is an axle box suspension of a railcar bogie, the axle box suspension coupling an axle box to a bogie frame, the axle box accommodating a bearing supporting an axle, the axle box suspension comprising: an axle beam including an axle beam main body portion extending from the axle box in a car longitudinal direction and a pin portion projecting from a tip end of the axle beam main body portion in the car longitudinal direction; a tubular elastic bushing including an inner tube portion, an outer tube portion, and an elastic portion interposed between the inner tube portion and the outer tube portion, the inner tube portion being fitted to the pin portion; an adapter attached to the outer tube portion and coupling the axle beam and the bogie frame; and a first stopper attached to the pin portion and configured to, when the axle box is displaced relative to the bogie frame toward one side in the car longitudinal direction by a predetermined distance, contact the adapter to restrict displacement of the axle box.

According to the above configuration, in the axle box suspension configured such that the axle box is easily displaced relative to the bogie frame in the car longitudinal direction by extending an axis of the elastic bushing in the car longitudinal direction, the first stopper is arranged in the vicinity of the elastic bushing serving as a swing fulcrum of the axle beam. Therefore, even in a state where the first stopper is in contact with the adapter, this contact state hardly becomes resistance to swinging of the axle beam. On this account, relative displacement between the axle box and the bogie frame in a vertical direction is smoothly performed, and fluctuations of wheel loads with the first stopper acting can be suppressed. Further, for example, displacement of the axle box (wheelset) toward a bogie center by a predetermined displacement magnitude or more can be restricted by arranging the first stopper at a side, close to the axle box main body portion, of the adapter.

Advantageous Effects of Invention

According to the present invention, in an axle box suspension configured such that an axis of an elastic bushing extends in a car longitudinal direction, fluctuations of wheel loads can be suppressed with a stopper acting.

DESCRIPTION OF EMBODIMENTS

Hereinafter, an embodiment will be explained in reference to the drawings. In the following explanations, a direction in which a railcar travels and a carbody extends is defined as a car longitudinal direction, and a crosswise direction perpendicular to the car longitudinal direction is defined as a car width direction. The car longitudinal direction may also be referred to as a forward/rearward direction, and the car width direction may also be referred to as a leftward/rightward direction. To be specific, the railcar can travel in both directions along the car longitudinal direction, but if the railcar travels in one of the both directions, a front side in a proceeding direction of the railcar may be referred to as a front side, and a rear side in the proceeding direction may be referred to as a rear side.

Figure 1:
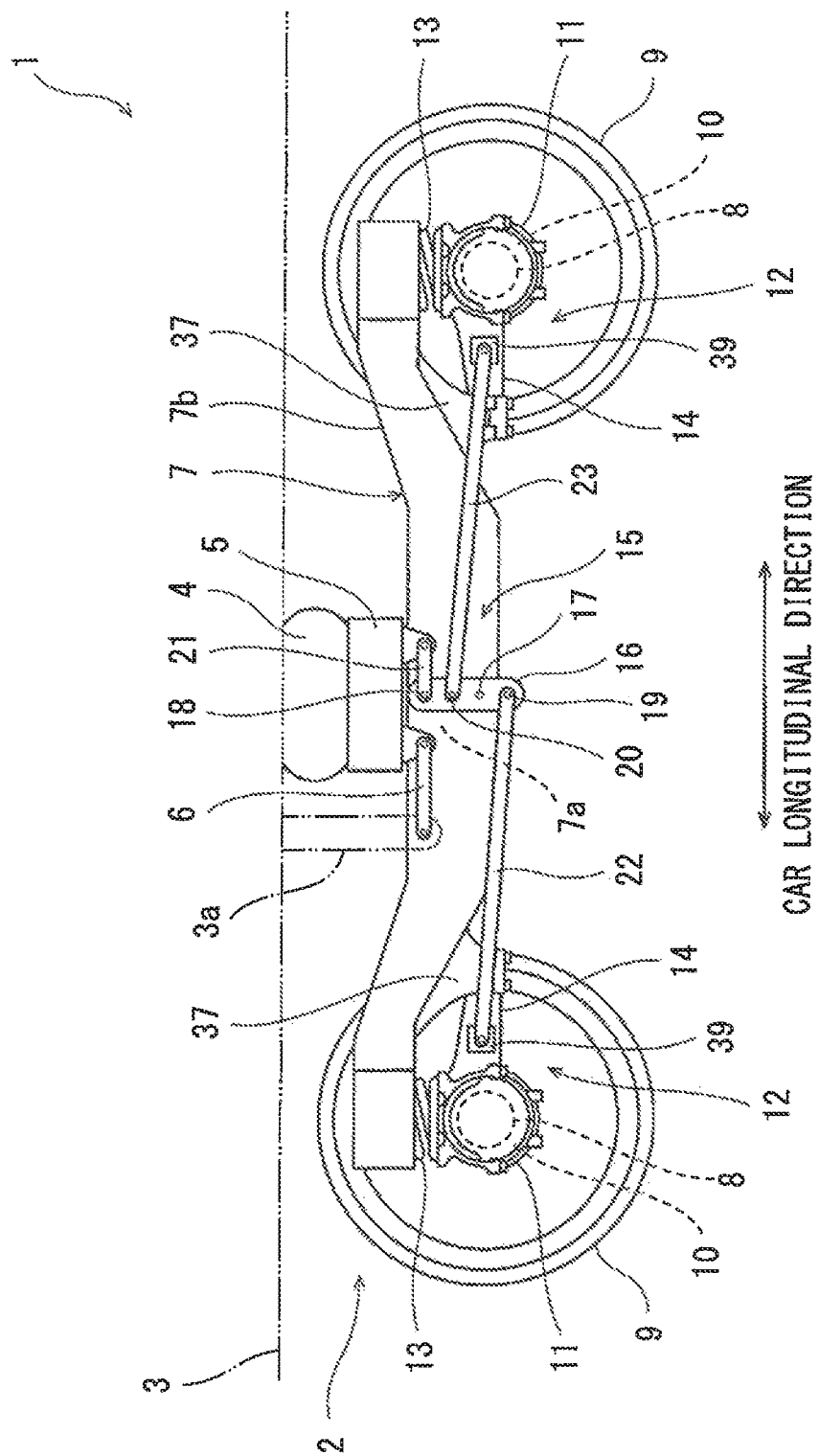
FIG. 1 is a side view of a railcar bogie according to an embodiment.

FIG. 1 is a side view of a railcar bogie 2 according to the embodiment. As shown in FIG. 1, the bogie 2 of the present embodiment is a steering bogie. The bogie 2 supports a carbody 3 of a railcar 1 from below. The bogie 2 includes a bolster 5 extending in the car width direction and supporting the carbody 3 through an air spring 4. The bolster 5 is connected to a bracket 3a of the carbody 3 by a bolster anchor 6. The bolster 5 is connected to a bogie frame 7 through a turn guide mechanism (for example, a center pin and a center plate) arranged at a bogie center. To be specific, the bogie frame 7 supports the bolster 5 from below so as to be rotatable relative to the bolster 5 in a yawing direction.

The bogie frame 7 includes a cross beam 7a and a pair of side sills 7b. The cross beam 7a extends in the car width direction under the bolster 5. The side sills 7b are connected to both respective car width direction end portions of the cross beam 7a and extend in the car longitudinal direction. A pair of axles 8 each extending in the car width direction are arranged at both respective car longitudinal direction sides of the cross beam 7a. Wheels 9 are provided at both respective car width direction side portions of each of the axles 8. Bearings 10 rotatably supporting the axle 8 are provided at both respective car width direction end portions of the axle 8 so as to be located outside the respective wheels in the car width direction. The bearings 10 are accommodated in respective axle boxes 11. Each of the axle boxes 11 is elastically coupled to the corresponding side sill 7b by a corresponding one of axle box suspensions 12 (suspensions). Each of the axle box suspensions 12 includes an axle spring 13 (coil spring) and an axle beam 14. The axle spring 13 is interposed between the side sill 7b and the axle box 11 at an upper side of the axle box 11. The axle beam 14 projects from the axle box 11 toward a bogie middle side in the car longitudinal direction in a side view and is coupled to the side sill 7b. According to the axle box suspension 12, by the expansion and contraction of the axle spring 13, the axle beam 14 may swing upward and downward relative to the bogie frame 7 based on a position of a below-described elastic bushing 24 as a swing fulcrum.

The bogie 2 includes a link mechanism 15 configured to steer the pair of axles 8 by tilting the pair of axles 8 relative to the bogie frame 7 in the yawing direction. The link mechanism 15 includes a steering lever 16 arranged outside the bogie frame 7 in the car width direction. The steering lever 16 includes a fulcrum 17, a force point 18, a first action point 19, and a second action point 20. The first action point 19 is arranged at one side of the fulcrum 17, and the second action point 20 is arranged at the other side of the fulcrum 17. The steering lever 16 is supported by the bogie frame 7 so as to be turnable about an axis extending in the car width direction at the fulcrum 17. The steering lever 16 is coupled to the bolster 5 at the force point 18 through a coupling link 21. The steering lever 16 is coupled to the axle box 11, located at one side in the car longitudinal direction, at the first action point 19 through a first steering link 22 (and the axle beam 14). The steering lever 16 is coupled to the axle box 11, located at the other side in the car longitudinal direction, at the second action point 20 through a second steering link 23 (and the axle beam 14). According to this configuration, when the bogie 2 passes through a curved line, the link mechanism 15 operates in conjunction with the turning of the bogie frame 7 relative to the bolster 5 about a vertical axis. With this, the steering lever 16 turns about the fulcrum 17 in a vertical flat plane, and this displaces the axle beams 14 relative to the bogie frame 7 in the car longitudinal direction. Thus, the pair of axles 8 are steered.

Figure 2:
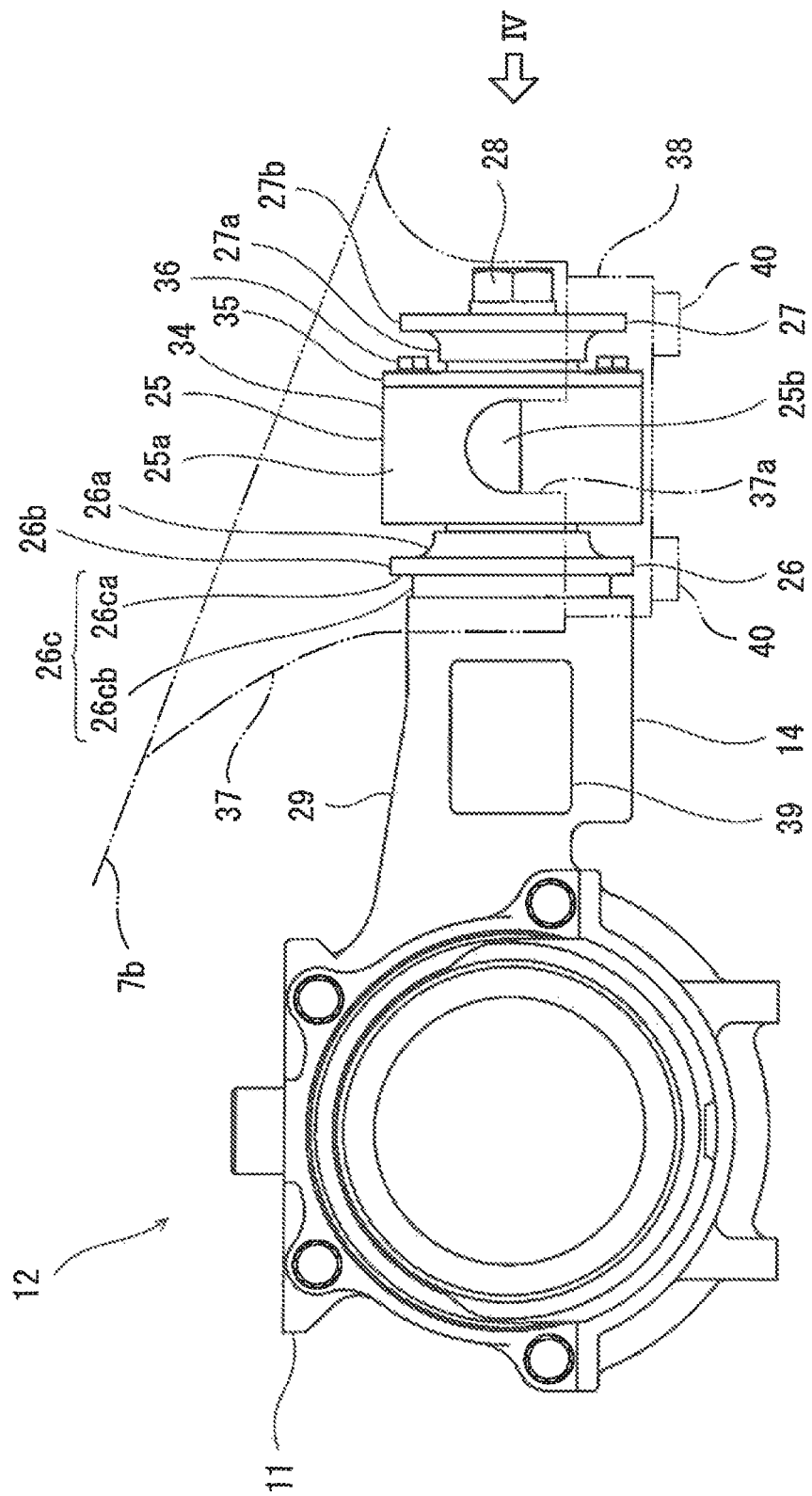
FIG. 2 is a side view of an axle box suspension of the bogie shown in FIG. 1.
Figure 3:
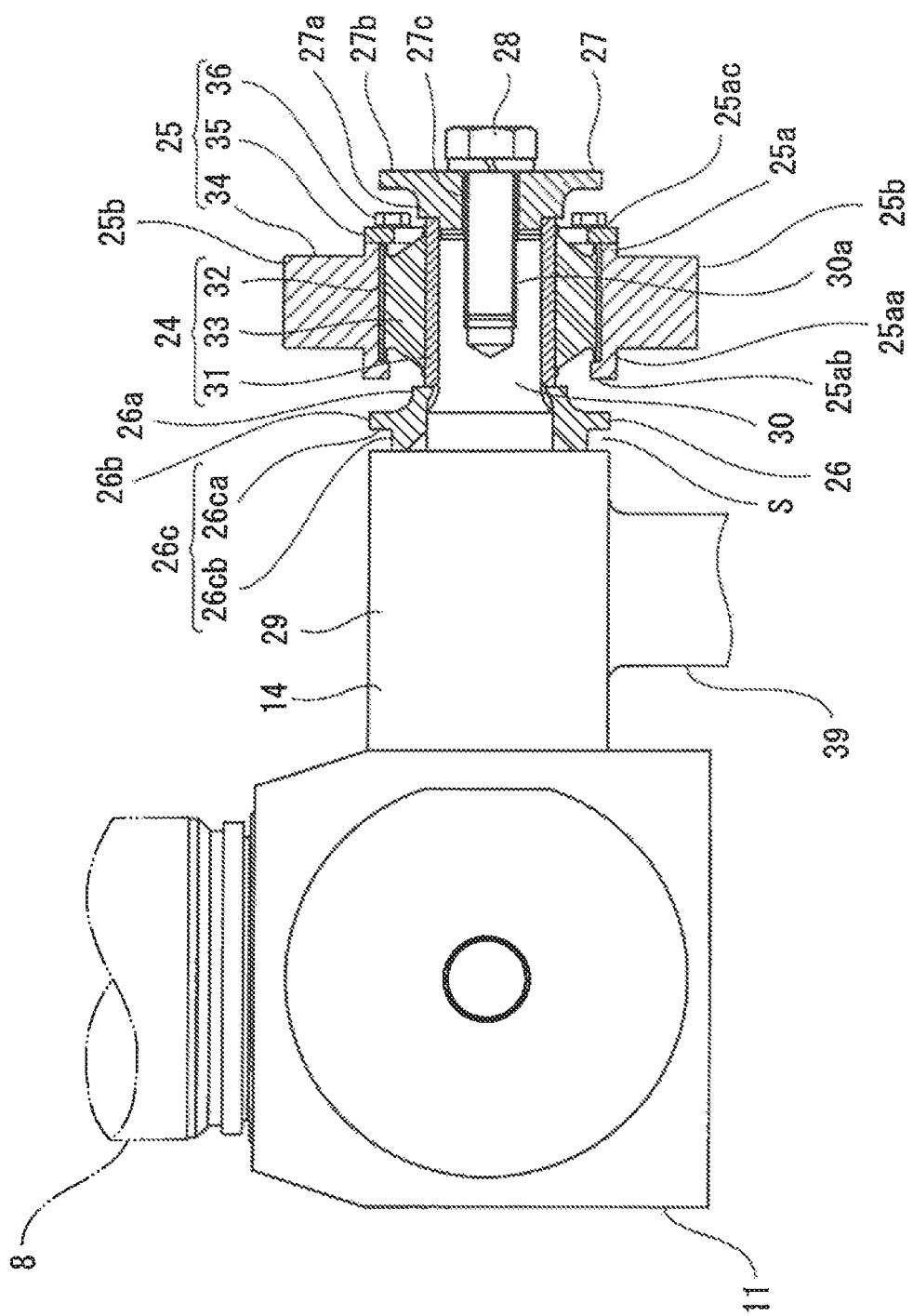
FIG. 3 is a partial sectional plan view of the axle box suspension shown in FIG. 2.
Figure 4:
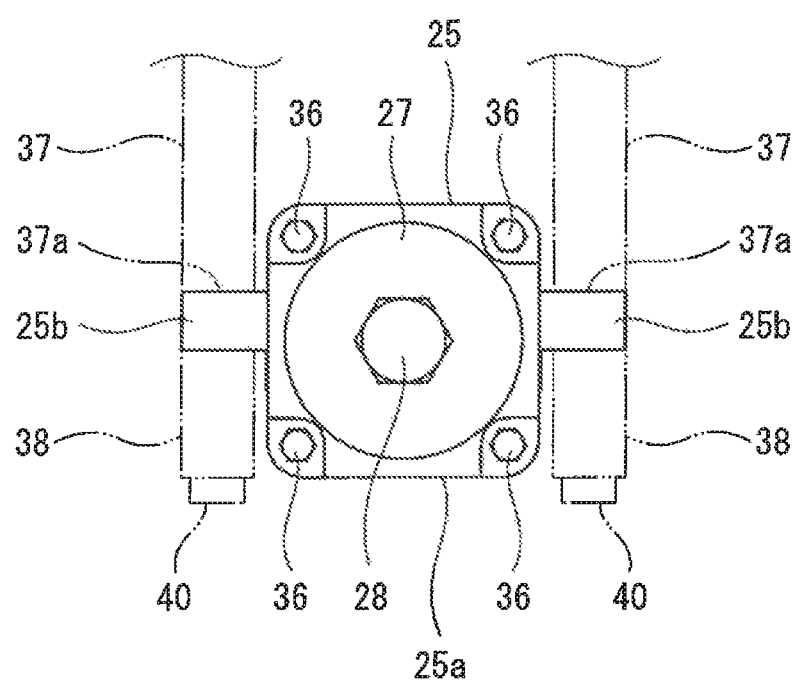
FIG. 4 is an arrow view when viewed from an arrow IV shown in FIG. 2.

FIG. 2 is a side view of the axle box suspension 12 of the bogie 2 shown in FIG. 1. FIG. 3 is a partial sectional plan view of the axle box suspension 12 shown in FIG. 2. FIG. 4 is an arrow view when viewed from an arrow IV shown in FIG. 2. As shown in FIGS. 2 to 4, the axle box suspension 12 includes the axle beam 14, the elastic bushing 24, an adapter 25, a first stopper 26, a second stopper 27, and a bolt 28. The axle beam 14 includes an axle beam main body portion 29, a pin portion 30, and a link coupling portion 39. The axle beam main body portion 29 extends from the axle box 11 toward the bogie middle side in the car longitudinal direction in a side view. The pin portion 30 extends from a tip end of the axle beam main body portion 29 toward the bogie middle side in the car longitudinal direction in a side view. The link coupling portion 39 extends from the axle beam main body portion 29. The axle beam main body portion 29 is larger in size in a vertical direction and the car width direction than the pin portion 30. The pin portion 30 has a columnar shape. The link coupling portion 39 extends to a position displaced relative to the pin portion 30 in the car width direction. At this position, the link coupling portion 39 is coupled to an end portion of the first steering link 22 of the link mechanism 15.

The elastic bushing 24 includes: an inner tube portion 1 made of metal; an outer tube portion 32 made of metal; and a tubular elastic portion 33 sandwiched between the inner tube portion 31 and the outer tube portion 32 and constituted by an elastic member (for example, rubber). The elastic bushing 24 is arranged in such a posture that an axis of the elastic bushing 24 extends in the car longitudinal direction. The inner tube portion 31 is press-fitted to the pin portion 30. A length of the outer tube portion 32 in the car longitudinal direction is shorter than a length of the inner tube portion 31 in the car longitudinal direction. The elastic portion 33 has such a shape that a size of the elastic portion 33 in the car longitudinal direction decreases as the elastic portion 33 extends toward a radially outer side of the elastic portion 33.

With the adapter 25 attached to the outer tube portion 32 from outside, the adapter 25 is connected to the bogie frame 7. With this, the adapter 25 couples the axle beam 14 and the bogie frame 7. The adapter 25 includes a casing portion 25a and a pair of protruding portions 25b. The casing portion 25a accommodates the elastic bushing 24. The protruding portions 25b project from the casing portion 25a toward both respective sides in the car width direction. The casing portion 25a holds the outer tube portion 32 such that the outer tube portion 32 is relatively nondisplaceable in the car longitudinal direction. The casing portion 25a includes a tube portion 25aa, a first flange portion 25ab, and a second flange portion 25ac. The tube portion 25aa is fitted to the outer tube portion 32 from outside. The first flange portion 25ab projects toward a radially inner side from one car longitudinal direction side (side where the axle beam main body portion 29 is provided) of the tube portion 25aa. The second flange portion 25ac projects toward the radially inner side from the other car longitudinal direction side of the tube portion 25aa.

In the present embodiment, the adapter 25 includes a main body member 34, a flange member 35, and bolts 36 by which the flange member 35 is detachably fixed to the main body member 34. The main body member 34 includes the tube portion 25aa, the first flange portion 25ab, and the protruding portions 25b. The flange member 35 includes the second flange portion 25ac. To be specific, the casing portion 25a is formed by fixing the flange member 35 to the main body member 34. Each of the side sills 7b of the bogie frame 7 is provided with a receiving seat 37 including a fitting groove 37a that is open downward. A length of the fitting groove 37a in the vertical direction is longer than a length of the protruding portion 25b in the vertical direction. The protruding portion 25b of the adapter 25 is fitted into the fitting groove 37a from below. In this state, a lid member 38 is fixed to the receiving seat 37 by bolts 40 so as to close a lower opening of the fitting groove 37a. With this, the lid member 38 contacts the protruding portion 25b from below, and the protruding portion 25b is supported by the lid member 38.

The first stopper 26, the elastic bushing 24, and the second stopper 27 are lined up in this order along the car longitudinal direction from the side where the axle beam main body portion 29 is provided, toward the bogie middle side. The first stopper 26 is attached to the pin portion 30 at a side of the elastic bushing 24, the side being close to the axle beam main body portion 29. The first stopper 26 includes a ring portion 26a and a stopper portion 26b. The ring portion 26a is press-fitted to the pin portion 30. The ring portion 26a opposes and contacts the inner tube portion 31 from a side of the inner tube portion 31, the side being close to the axle beam main body portion 29. The ring portion 26a also opposes and contacts an end surface of the axle beam main body portion 29 from a side of the axle beam main body portion 29, the side being close to the pin portion 30. The stopper portion 26b projects in a flange shape from the ring portion 26a toward the radially outer side.

When the bogie 2 travels through a straight line, the stopper portion 26b opposes the adapter 25 in the car longitudinal direction so as to be spaced apart from the adapter 25. On the other hand, for example, when the bogie 2 passes through a curved line, and the axle box 11 is displaced relative to the bogie frame 7 toward the bogie middle side in the car longitudinal direction by a predetermined distance, the stopper portion 26b contacts the adapter 25 to restrict further displacement of the axle box 11 toward the bogie middle side. The stopper portion 26b includes a level difference portion 26c on which a pull-out jig 50 (see FIG. 5) can be mounted. The pull-out jig 50 is used to pull out the elastic bushing 24 from the pin portion 30. The level difference portion 26c includes a back surface 26ca and a peripheral surface 26cb. The back surface 26ca opposes a space S and faces the axle beam main body portion 29, the space S being open toward the radially outer side. The peripheral surface 26cb is continuous with a radially inner end of the back surface 26ca, faces the radially outer side, and opposes the space S.

The second stopper 27 is attached to the pin portion 30 by the bolt 28 at an opposite side of the first stopper 26 across the elastic bushing 24. The second stopper 27 includes a ring portion 27a and a stopper portion 27b. The bolt 28 is inserted into a center hole 27c of the ring portion 27a and threadedly engaged with an internal screw hole 30a formed on a tip end surface of the pin portion 30. The ring portion 27a opposes and contacts the inner tube portion 31 from an opposite side of the first stopper 26 across the inner tube portion 31. The stopper portion 27b projects in a flange shape from the ring portion 27a toward the radially outer side. When the bogie 2 travels through a straight line, the stopper portion 27b opposes the adapter 25 in the car longitudinal direction so as to be spaced apart from the adapter 25. On the other hand, for example, when the bogie 2 passes through a curved line, and the axle box 11 is displaced relative to the bogie frame 7 outward in the car longitudinal direction by a predetermined distance, the stopper portion 27b contacts the adapter 25 to restrict further displacement of the axle box 11 outward in the car longitudinal direction.

Figure 5:
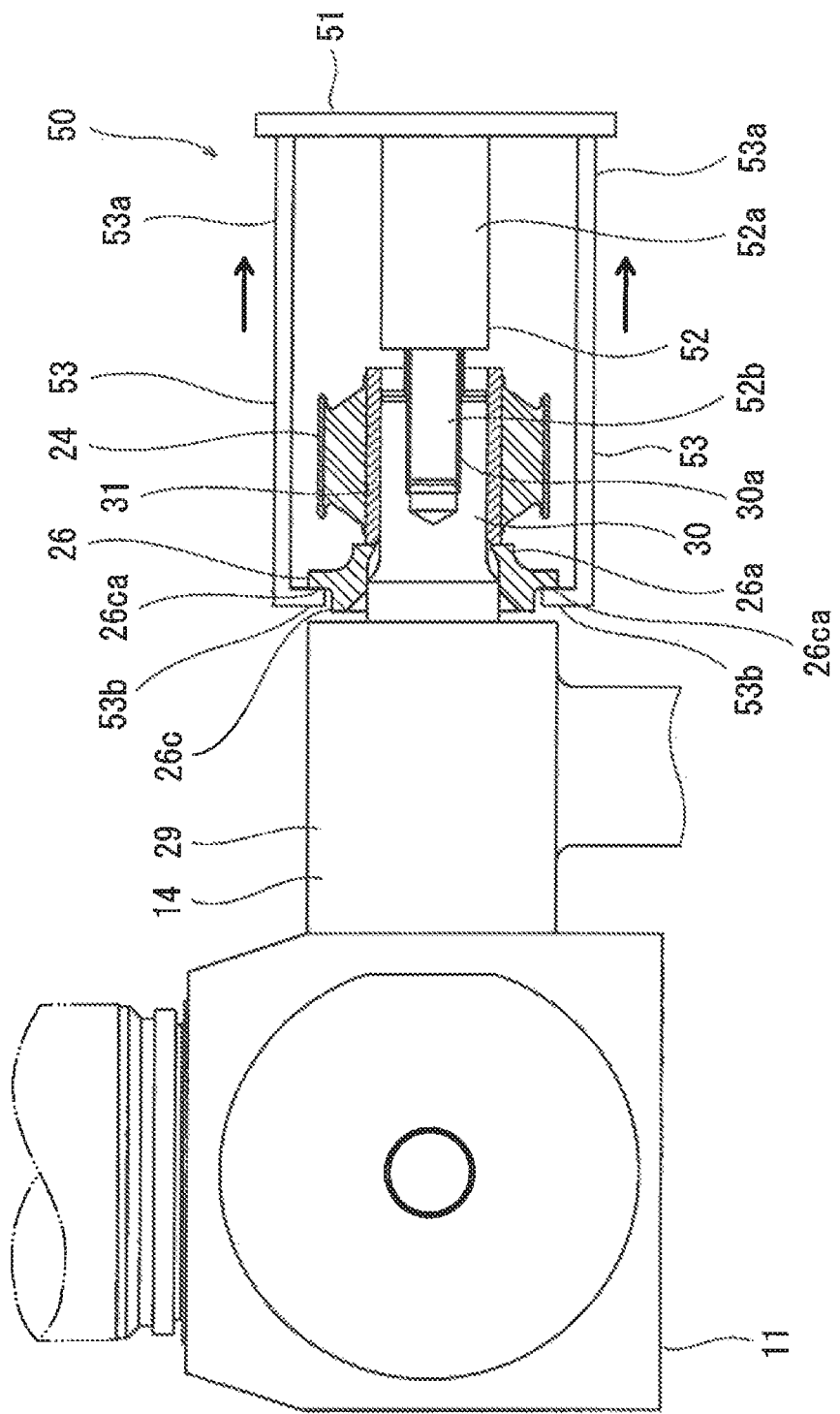
FIG. 5 is a diagram for explaining detachment of a rubber bushing of the axle box suspension shown in FIG. 3.

Next, a procedure of detaching the elastic bushing 24 at the time of maintenance will be explained. FIG. 5 is a diagram for explaining the detachment of the elastic bushing 24 of the axle box suspension 12 shown in FIG. 3. As shown in FIGS. 3 and 5, at the time of maintenance, the second stopper 27 is detached by removing the bolt 28, and then, the flange member 35 is detached by removing the bolts 36. In this state, the pull-out jig 50 by which the elastic bushing 24 is pulled out from the pin portion 30 is mounted on the level difference portion 26c of the first stopper 26. As one example, the pull-out jig 50 includes a base portion 51, a hydraulic cylinder 52 provided at the base portion 51, and a pull-out arm 53 provided at the base portion 51. The hydraulic cylinder 52 includes a cylinder portion 52a and a piston rod portion 52b. The cylinder portion 52a is fixed to the base portion 51. The piston rod portion 52b advances and retreats relative to the cylinder portion 52a, and an external screw is formed on the piston rod portion 52b. The pull-out arm 53 includes an arm portion 53a and a hook portion 53b. The arm portion 53a is fixed to the base portion 51 and extends toward the axle beam main body, portion 29. The hook portion 53b extends from a tip end of the arm portion 53a toward the radially inner side.

The pull-out jig 50 is set such that the hook portion 53b contacts the back surface 26ca of the level difference portion 26c with the piston rod portion 52b threadedly engaged with the internal screw hole 30a of the pin portion 30. In this state, by expanding the hydraulic cylinder 52, the first stopper 26 is pulled out toward a tip end of the pin portion 30 together with the elastic bushing 24. To be specific, the ring portion 26a of the first stopper 26 pushes the inner tube portion 31 of the elastic bushing 24 in the car longitudinal direction, and with this, the elastic bushing 24 press-fitted to the pin portion 30 is pulled out.

According to the configuration explained above, in the axle box suspension 12 configured such that the axle box 11 is easily displaced relative to the bogie frame 7 in the car longitudinal direction by extending the axis of the elastic bushing 24 in the car longitudinal direction, the first stopper 26 and the second stopper 27 are arranged in the vicinity of the elastic bushing 24 serving as the swing fulcrum of the axle beam 14. Therefore, even in a state where the first stopper 26 or the second stopper 27 is in contact with the adapter 25, this contact state hardly becomes resistance to the swinging of the axle beam 14. On this account, relative displacement between the axle box 11 and the bogie frame 7 in the vertical direction is smoothly performed, and fluctuations of wheel loads with the first stopper 26 or the second stopper 27 acting can be suppressed.

When the axle box 11 is displaced toward the bogie center beyond a displacement magnitude generated when the axles are maximally steered, due to a damage of the link mechanism 15 of the steering bogie 2 or any other reason, the first stopper 26 can restrict the displacement of a predetermined displacement magnitude or more. Or, when the axle box 11 is displaced outward in the car longitudinal direction, the second stopper 27 can restrict the displacement of a predetermined displacement magnitude or more. To be specific, since the elastic bushing 24 is sandwiched between the first stopper 26 and the second stopper 27, excessive displacement of the axle box 11 relative to the bogie frame 7 toward both sides in the car longitudinal direction can be prevented. Further, the second stopper 27 can also serve as a retainer for the elastic bushing 24.

When detaching the elastic bushing 24 at the time of maintenance, the back surface 26ca of the level difference portion 26c of the first stopper 26 is strongly pushed by the pull-out jig 50 toward the tip end of the pin portion 30. With this, the ring portion 26a of the first stopper 26 pushes the inner tube portion 31 of the elastic bushing 24. Thus, the elastic bushing 24 can be smoothly pulled out from the pin portion 30. Therefore, the elastic bushing 24 press-fitted to the pin portion 30 for preventing vibrations can be easily detached.

When performing work of connecting the adapter 25 to the bogie frame 7, and even when relative positions of the protruding portion 25b and the fitting groove 37a in the vertical direction are displaced to some extent, at least a part of the protruding portion 25b can be fitted into the fitting groove 37a. Therefore, even when a distance between the axle box 11 and the bogie frame 7 in the vertical direction is relatively long since the carbody 3 is not mounted on the bogie 2, the above connecting work can be easily performed.

The present invention is not limited to the above embodiment, and modifications, additions, and eliminations may be made with respect to the configuration of the present invention. When the bogie 2 is a bolsterless bogie, the coupling link 21 may be coupled to the carbody. The first stopper 26 may be formed integrally with the axle beam 14. The bogie 2 does not have to be a steering bogie. The link mechanism is not limited to the configuration of the embodiment and is only required to be able to steer the axles by operating in accordance with relative turning of the bogie frame about the vertical axis. For example, in the above embodiment, the steering lever 16 is arranged at the bogie middle in a side view. However, the steering lever may be arranged at a position displaced from the bogie middle in the car longitudinal direction in a side view.

REFERENCE SIGNS LIST 1 railcar
2 bogie
3 carbody
5 bolster
7 bogie frame
8 axle
10 bearing
11 axle box
12 axle box suspension
14 axle beam
15 link mechanism
24 elastic bushing
25 adapter
25a casing portion
25b protruding portion
26 first stopper
26a ring portion
26b stopper portion
26c level difference portion
27 second stopper
29 axle beam main body portion
30 pin portion
31 inner tube portion
32 outer tube portion
33 elastic portion
37 receiving seat
37a fitting groove
39 link coupling portion
50 pull-out jig

The invention claimed is:

1. An axle box suspension of a railcar bogie,
the axle box suspension coupling an axle box to a bogie frame, the axle box accommodating a bearing supporting an axle,
the axle box suspension comprising:
an axle beam including
an axle beam main body portion extending from the axle box in a car longitudinal direction and
a pin portion projecting from a tip end of the axle beam main body portion in the car longitudinal direction;
a tubular elastic bushing including an inner tube portion, an outer tube portion, and an elastic portion interposed between the inner tube portion and the outer tube portion, the inner tube portion being fitted to the pin portion;
an adapter attached to the outer tube portion and coupling the axle beam and the bogie frame; and
a first stopper attached to the pin portion and configured to, when the axle box is displaced relative to the bogie frame toward one side in the car longitudinal direction by a predetermined distance, contact the adapter to restrict displacement of the axle box.

2. The axle box suspension according to claim 1, wherein:
the first stopper and the elastic bushing are press-fitted to the pin portion so as to be arranged in this order along the car longitudinal direction from a side where the axle beam main body portion is provided;
the first stopper includes
a ring portion opposing the inner tube portion from a side of the inner tube portion, the side being close to the axle beam main body portion and
a stopper portion projecting from the ring portion toward a radially outer side and opposing the adapter from a side of the adapter, the side being close to the axle beam main body portion; and
the stopper portion includes a level difference portion on which a pull-out jig is mountable, the pull-out jig being configured to pull out the elastic bushing.

3. The axle box suspension according to claim 1, further comprising a second stopper attached to the pin portion at an opposite side of the first stopper across the elastic bushing and configured to, when the axle box is displaced relative to the bogie frame toward the other side in the car longitudinal direction by a predetermined distance, contact the adapter to restrict the displacement of the axle box.

4. The axle box suspension according to claim 1, wherein:
the bogie frame includes a receiving seat including a fitting groove that is open downward; and
the adapter includes
a casing portion accommodating the elastic bushing and
a protruding portion projecting from the casing portion in a car width direction, fitted into the fitting groove from below, and coupling the axle beam and the bogie frame through the elastic bushing.

5. The axle box suspension according to claim 1, wherein:
the axle box suspension is configured to be applied to a steering bogie configured to steer the axle by operating a link mechanism in accordance with turning of the bogie frame relative to a carbody or a bolster about a vertical axis;

the axle beam further includes a link coupling portion extending from the axle beam main body portion and coupled to an end portion of the link mechanism at a position displaced relative to the pin portion in a car width direction; and when the link mechanism operates in accordance with the turning of the bogie frame, the axle beam is displaced relative to the bogie frame in the car longitudinal direction.

6. The axle box suspension according to claim 2, further comprising a second stopper attached to the pin portion at an opposite side of the first stopper across the elastic bushing and configured to, when the axle box is displaced relative to the bogie frame toward the other side in the car longitudinal direction by a predetermined distance, contact the adapter to restrict the displacement of the axle box.

7. The axle box suspension according to claim 2, wherein:
the bogie frame includes a receiving seat including a fitting groove that is open downward; and
the adapter includes
a casing portion accommodating the elastic bushing and
a protruding portion projecting from the casing portion in a car width direction, fitted into the fitting groove from below, and coupling the axle beam and the bogie frame through the elastic bushing.

8. The axle box suspension according to claim 3, wherein:
the bogie frame includes a receiving seat including a fitting groove that is open downward; and
the adapter includes
a casing portion accommodating the elastic bushing and
a protruding portion projecting from the casing portion in a car width direction, fitted into the fitting groove from below, and coupling the axle beam and the bogie frame through the elastic bushing.

9. The axle box suspension according to claim 6, wherein:
the bogie frame includes a receiving seat including a fitting groove that is open downward; and
the adapter includes
a casing portion accommodating the elastic bushing and
a protruding portion projecting from the casing portion in a car width direction, fitted into the fitting groove from below, and coupling the axle beam and the bogie frame through the elastic bushing.

10. The axle box suspension according to claim 2, wherein:
the axle box suspension is configured to be applied to a steering bogie configured to steer the axle by operating a link mechanism in accordance with turning of the bogie frame relative to a carbody or a bolster about a vertical axis;
the axle beam further includes a link coupling portion extending from the axle beam main body portion and coupled to an end portion of the link mechanism at a position displaced relative to the pin portion in a car width direction; and
when the link mechanism operates in accordance with the turning of the bogie frame, the axle beam is displaced relative to the bogie frame in the car longitudinal direction.

11. The axle box suspension according to claim 3, wherein:
the axle box suspension is configured to be applied to a steering bogie configured to steer the axle by operating a link mechanism in accordance with turning of the bogie frame relative to a carbody or a bolster about a vertical axis;
the axle beam further includes a link coupling portion extending from the axle beam main body portion and coupled to an end portion of the link mechanism at a position displaced relative to the pin portion in a car width direction; and
when the link mechanism operates in accordance with the turning of the bogie frame, the axle beam is displaced relative to the bogie frame in the car longitudinal direction.

12. The axle box suspension according to claim 4, wherein:
the axle box suspension is configured to be applied to a steering bogie configured to steer the axle by operating a link mechanism in accordance with turning of the bogie frame relative to a carbody or a bolster about a vertical axis;
the axle beam further includes a link coupling portion extending from the axle beam main body portion and coupled to an end portion of the link mechanism at a position displaced relative to the pin portion in a car width direction; and
when the link mechanism operates in accordance with the turning of the bogie frame, the axle beam is displaced relative to the bogie frame in the car longitudinal direction.

13. The axle box suspension according to claim 6, wherein:
the axle box suspension is configured to be applied to a steering bogie configured to steer the axle by operating a link mechanism in accordance with turning of the bogie frame relative to a carbody or a bolster about a vertical axis;
the axle beam further includes a link coupling portion extending from the axle beam main body portion and coupled to an end portion of the link mechanism at a position displaced relative to the pin portion in a car width direction; and
when the link mechanism operates in accordance with the turning of the bogie frame, the axle beam is displaced relative to the bogie frame in the car longitudinal direction.

14. The axle box suspension according to claim 7, wherein:
the axle box suspension is configured to be applied to a steering bogie configured to steer the axle by operating a link mechanism in accordance with turning of the bogie frame relative to a carbody or a bolster about a vertical axis;
the axle beam further includes a link coupling portion extending from the axle beam main body portion and coupled to an end portion of the link mechanism at a position displaced relative to the pin portion in a car width direction; and
when the link mechanism operates in accordance with the turning of the bogie frame, the axle beam is displaced relative to the bogie frame in the car longitudinal direction.

15. The axle box suspension according to claim 8, wherein:
the axle box suspension is configured to be applied to a steering bogie configured to steer the axle by operating a link mechanism in accordance with turning of the bogie frame relative to a carbody or a bolster about a vertical axis;

the axle beam further includes a link coupling portion extending from the axle beam main body portion and coupled to an end portion of the link mechanism at a position displaced relative to the pin portion in a car width direction; and when the link mechanism operates in accordance with the turning of the bogie frame, the axle beam is displaced relative to the bogie frame in the car longitudinal direction.

16. The axle box suspension according to claim 9, wherein:

the axle box suspension is configured to be applied to a steering bogie configured to steer the axle by operating a link mechanism in accordance with turning of the bogie frame relative to a carbody or a bolster about a vertical axis;

the axle beam further includes a link coupling portion extending from the axle beam main body portion and coupled to an end portion of the link mechanism at a position displaced relative to the pin portion in a car width direction; and when the link mechanism operates in accordance with the turning of the bogie frame, the axle beam is displaced relative to the bogie frame in the car longitudinal direction.

* * * * *